United States Patent [19]

Nishito et al.

[11] Patent Number: 4,464,786
[45] Date of Patent: Aug. 7, 1984

[54] SYSTEM FOR IDENTIFYING CURRENCY NOTE

[75] Inventors: Akihiro Nishito, Kawasaki; Ko Ohtombe, Tokyo; Susumu Yamakawa; Yasushi Nakamura, both of Yokohama, all of Japan

[73] Assignee: Tokyo Shibaura Denki Kabushiki Kaisha, Kawasaki, Japan

[21] Appl. No.: 274,383

[22] Filed: Jun. 17, 1981

[51] Int. Cl.³ .............................................. G06K 9/62
[52] U.S. Cl. ............................................ 382/7; 382/34
[58] Field of Search ............... 235/419, 454, 487, 379; 194/4 E, 4 F, 4 R; 209/534; 250/560–563, 571, 572; 382/4, 7, 34, 36

[56] References Cited

U.S. PATENT DOCUMENTS

| | | | |
|---|---|---|---|
| 3,202,761 | 8/1965 | Bibbero | 382/4 |
| 4,041,456 | 8/1977 | Ott et al. | 382/7 |
| 4,096,991 | 6/1978 | Iguchi | 235/419 |
| 4,179,685 | 12/1979 | O'Maley | 382/7 |
| 4,231,014 | 10/1980 | Ponzio | 382/7 |
| 4,288,781 | 9/1981 | Sellner et al. | 382/7 |
| 4,356,473 | 10/1982 | Freudenthal | 382/7 |

Primary Examiner—Leo H. Boudreau
Attorney, Agent, or Firm—Cushman, Darby & Cushman

[57] ABSTRACT

A currency note identification system comprises a line sensor generating a scanning signal corresponding to the printed pattern on a currency note, an adder for summing picture element signals in the scanning signal from the line sensor for each scanning line, and a detecting circuit for detecting the leading and trailing edges of a printed section of the currency note from the sum signal output of the adder. Printed pattern data for printed patterns at predetermined positions with respect to the leading and trailing edges detected by the detecting circuit are detected, and the similarity of the detected pattern data to standard pattern data is calculated by a calculator. The kind and/or genuineness of the currency note is determined from the similarity obtained from the calculator.

17 Claims, 13 Drawing Figures

FIG. 10
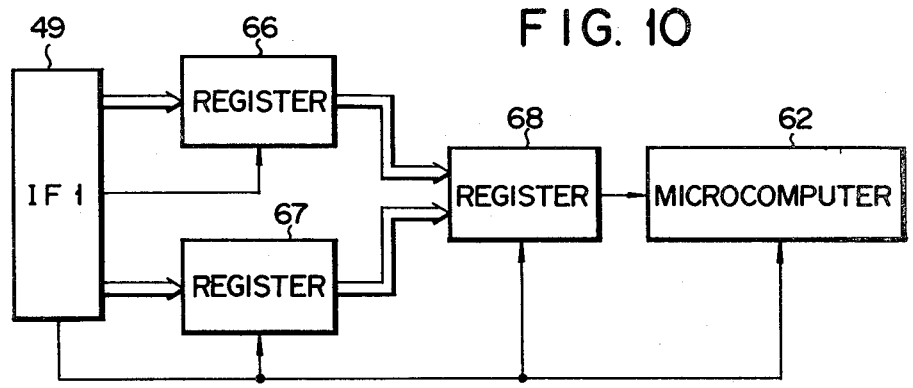
FIG. 11
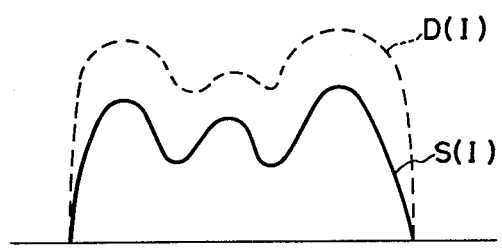
FIG. 12

SYSTEM FOR IDENTIFYING CURRENCY NOTE

BACKGROUND OF THE INVENTION

This invention generally relates to systems for identifying the kind and authenticity of printed matter such as currency notes.

With the recent spread of vending machines, money changers, band terminal machines etc., systems for examining and verifying the kind and authenticity of currency notes (band notes) such as one dollar notes, ten dollar notes, one hundred notes, etc. are becoming important.

Various systems for identifying different kinds of currency notes have hitherto been developed. For example, U.S. Pat. No. 4,179,685 discloses a system, which detects the edges of a currency note, extracts a binary pattern for a predetermined portion of the currency note beween the detected edges thereof, calculates the degree of coincidence between the extracted binary pattern and a standard binary pattern and determines the examined currency note to be a genuine note if a predetermined degree of coincidence is obtained between the two binary patterns.

Such a prior art currency note identifying system, however, has the following problems.

Many currency notes have such disfigurements as deviations of printing position, wrinkles and contaminations, and with such band notes great fluctuations of the binary pattern data result from the wrinkles and contaminations; sometimes the examined bank note is not identified as a genuine note due to wrinkles or contaminations causing excessive fluctuations of the binary pattern.

In order to cope with the deviations of the printing position of bank notes, it has been proposed to provide a deviation or skew detector and compare the detected pattern with a number of standard patterns provided for respective deviations or skew angles. Such a method of identification, however, requires a large scale and hence high price apparatus.

SUMMARY OF THE INVENTION

An object of the invention, accordingly, is to provide a currency note identification system, which permits the identification of currency notes with high accuracy, at a high speed and with a small scale apparatus.

According to the invention, there is provided a currency note identification system, in which characteristic components contained in a plurality of scanning signals obtained through the scanning of a printed matter are extracted, at least one of the extracted characteristic components is compared to standard characteristic components, and the kind and/or genuineness of the printed matter is determined from the coincidence of compared components.

Also, according to the invention there is provided a currency note identification system, which comprises means for summing picture element signals in each of a plurality of scanning signals obtained through the scanning of a currency note, means for detecting the sum signal as multi-value data for each of the scanning signals, means for calculating the similarity of detected multi-value data to standard multi-value data, and means for determining the kind and/or genuineness of the examined currency note from the calculated similarity.

BRIEF DESCRIPTION OF THE DRAWINGS

FIG. 10 is a block diagram showing a final identification circuit used in the embodiment of FIG. 9.

FIG. 11 is a view showing examples of final identification.

FIG. 12 is a waveform diagram showing a scanning signal for illustrating the principles of a further embodiment of the currency note identification system according to the invention.

DETAILED DESCRIPTION OF THE INVENTION

Figure 1:
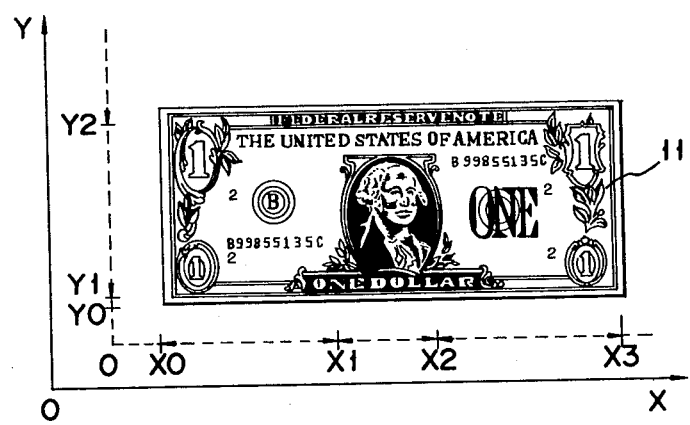
FIG. 1 is a plan view showing a bank note examined with one embodiment of the currency note identification system according to the invention.

FIG. 1 shows a currency note, e.g., a one-dollar bill 11. This bill 11 is scanned, for instance by a line sensor, in the direction of X-axis shown as main scanning and is conveyed, for instance by a conveyor, in the direction of Y-axis as auxiliary scanning. The X- and Y-axis scannings cover a sufficiently broad area of the bill, and an area between points $X_1$ and $X_2$ in he X-axis direction and between points $Y_1$ and $Y_2$ in the Y-axis direction is one from which data necessary for the identification is extracted. For the detection of the information extraction area between the points $X_1$ to $X_2$ and between the points $Y_1$ and $Y_2$, the printed section of the bill can be easily and reliably detected by having resort to the change of the printing density of the printed section. Generally, the bill has a frame-like margin, which is a nonprinted section and encloses a printed section which has an impression of various patterns, characters, a portrait, etc. As the printed section is finely scanned, for instance by a light beam, the intensity of the reflected or transmitted light changes in a predetermined manner. Thus, the photoelectric conversion signal (scanning signal) from a line sensor which has a function of scanning the note in the direction perpendicular to the direction of conveying the bill, is not changed for the nonprinted margin of the bill and changed for the printed section according to the intensity of light therefrom. Accordingly, the edge of the printed section can be detected by differentiating the scanning signal, detecting only the changes of differentiated scanning signal and checking a predetermined changes.

Figure 2:
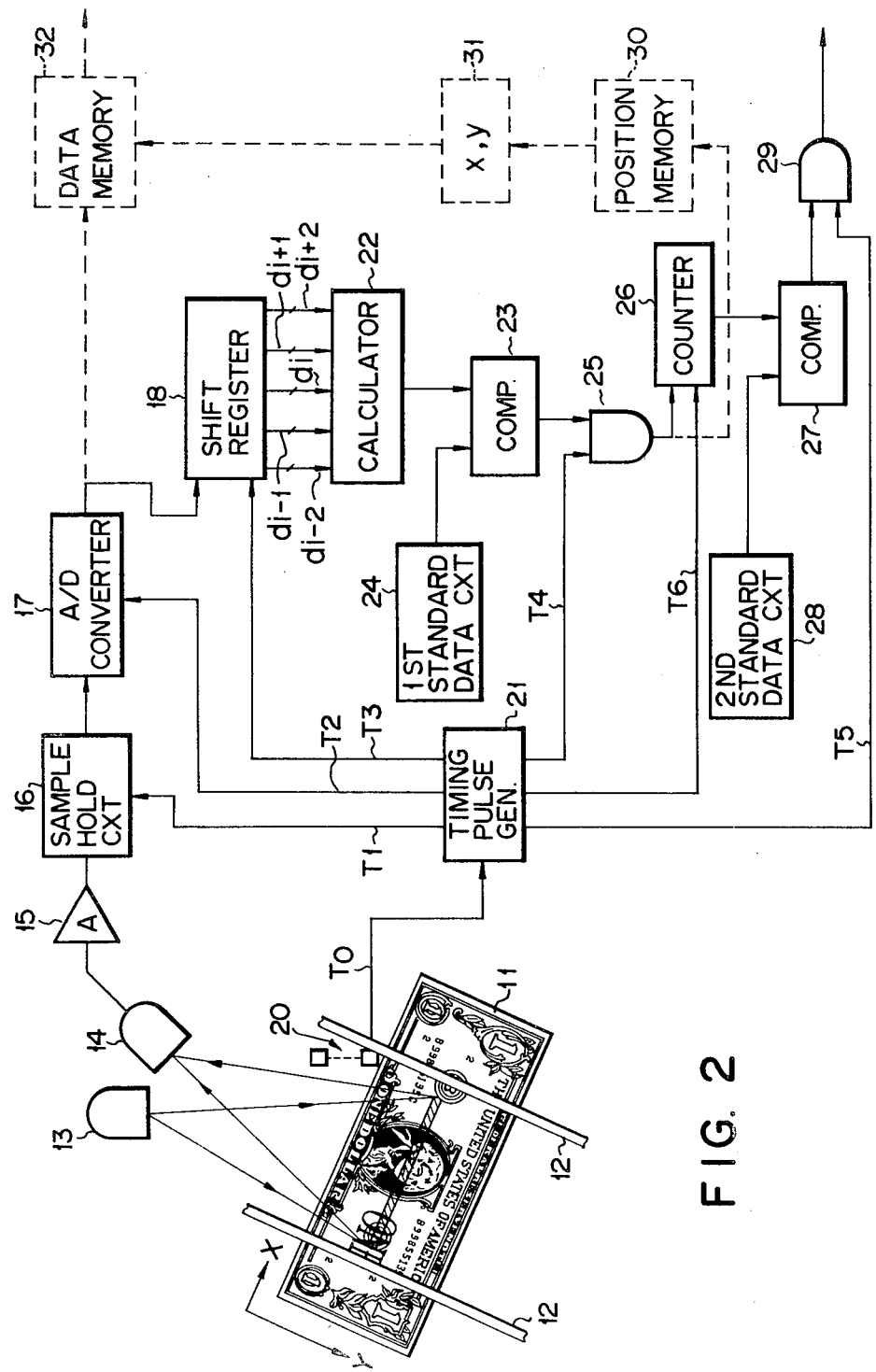
FIG. 2 is a block circuit diagram showing one embodiment of the currency note identification system according to the invention.

FIG. 2 shows the circuitry of a currency note identification system, which verifies the kind and/or genuineness of a bill 11 from a scanning signal corresponding to a particular portion of the printed section with the edges thereof detected on the basis of the principles discussed above. The bill 11 is conveyed by conveying belts 12 at a uniform speed in the direction of arrow Y, and its detected area A is irradiated from a light source 13. Light reflected from the detected area A is received by a line sensor 14, which has a function of scanning the area in the direction of arrow X. The line sensor 14 may be a CCD line sensor having, for instance, 128 picture elements. The output end of the line sensor 14 is coupled through a video amplifier 15 to the input terminal of a sample/hold circuit 16. The output of the sample/hold circuit 16 is coupled through an analog-to-digital (A/D) converter 17 to the input side of a shift register 18 and a data memory 32. A photo switch 20 which detects the edge of the bill 11 has its output terminal connected to the input terminal of a timing pulse generator 21. The timing pulse generator 21 has its timing pulse output ends connected respectively to the timing pulse input ends of the sample/hold circuit 16, A/D converter 17 and shift register 18. The shift register 18 is formed by five shift register stages with the output ends thereof connected to the respective input end of a calculator 22. The calculator 22 has its output end connected to one of input ends of a comparator 23, to the other input end of which is connected the output end of a first standard data circuit 24. The first standard data circuit 24 includes a memory where standard data as to various bills is stored. The output end of the comparator 23 and a timing pulse output end of the timing pulse generator 21 are connected to respective input ends of an AND gate 25, and the output end thereof is connected to an input end of a counter 26. The counter 26 has its output end connected to one input end of a comparator 27, to the other input end of which is connected the output end of a second standard data circuit 28. The standard data circuit 28 includes a memory where standard data of the printing densities of the printed sections of various bills is stored. The outut end of the comparator 27 and a timing pulse output end of the timing pulse generator 21 are connected to respective input ends of an AND gate 29. The AND gate 29 provides a signal $P_0$ representing the result of comparison in synchronism to a timing pulse $T_5$. The output end of the AND gate 25 is also connected to a position memory 30, which has its output end connected to the input end of a position calculator circuit 31. The position calculator circuit 31 has its output end connected to a data memory 32, to which the output end of the A/D converter 17 is also connected.

Figure 3:
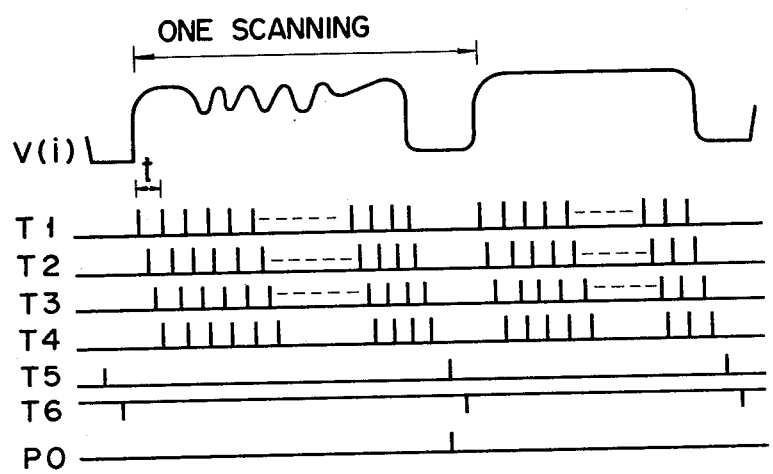
FIG. 3 is a time chart showing a scanning signal and timing signals.

In the currency note identification system described above, the line sensor 14 outputs a scanning signal $V(i)$ [$i=1$ to 128] as shown in FIG. 3, and this scanning signal $V(i)$ is amplified by the amplifier 15 before it is supplied to the sample/hold circuit 16. Meanwhile, when the photo switch 20 provides a trigger signal to the timing pulse generator 21 in response to the edge of the bill 20, the timing pulse generator 21 provides timing pulses $T_1$ to $T_6$ as shown in FIG. 3. The sample/hold circuit 16 samples the scanning signal $V(i)$ in response to the timing pulses $T_1$, and the sampled signal is supplied to the A/D converter 17. The A/D converter 17 converts the sampled scanning signal into an 8-bit digital signal $D(i)$ [$i=1$ to 128] in synchronism to the timing pulses $T_2$. When the 8-bit digital signal $D(i)$ enters the shift register 18, it is progressively shifted through the five stages in synchronism to the timing pulses $T_3$, and parallel signals $d(i-2)$, $d(i-1)$, $d(i)$, $d(i+1)$ and $d(i+2)$ [$i=3$ to 126] are supplied from the shift register 18 to the calculator 22. The calculator 22 performs processing on the input parallel signals according to an equation $$S(i) = |\{d(i-2)+d(i-1)-[d(i-1)+d(i-2)]\}| \tag{1}$$

Figure 4:
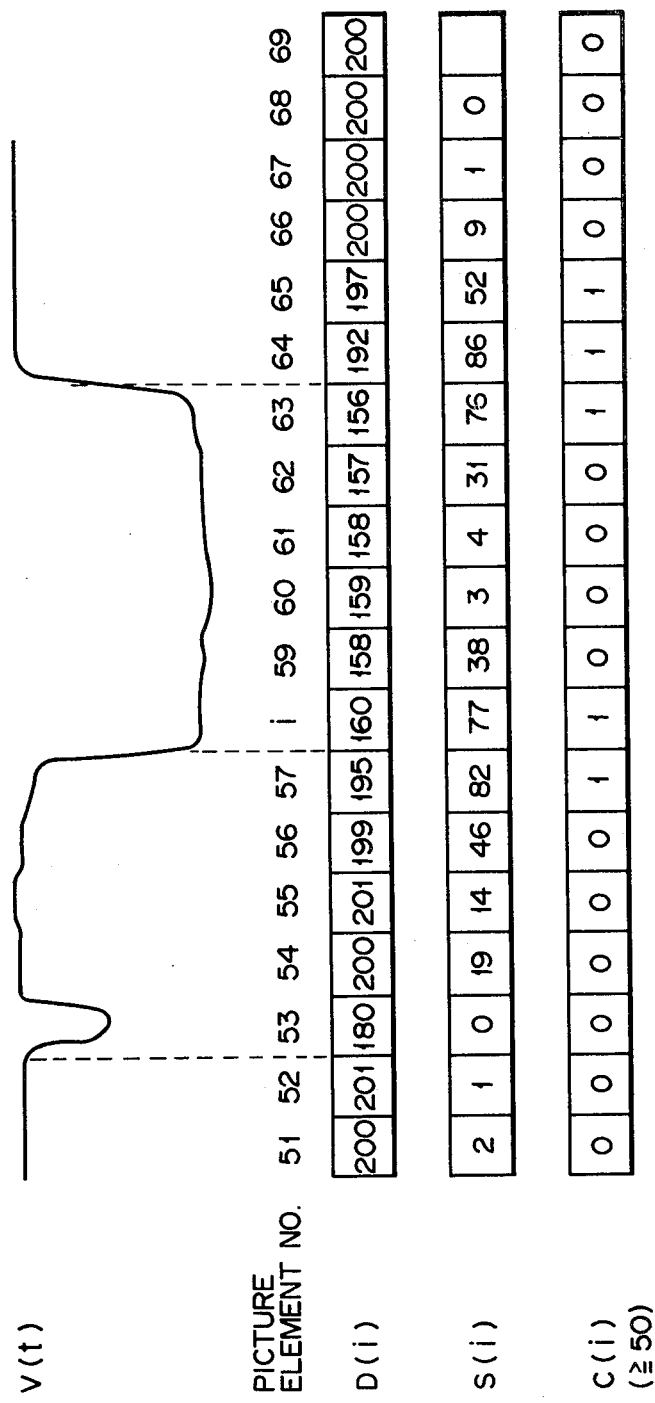
FIG. 4 is a view illustrating the processing of the scanning signal.

This operation will now be explained with reference to FIG. 4. The parallel signals of the shift register 18, i.e., signals corresponding to five picture elements, are substituted into the equation (1); for example, digital signals 199, 195, 160, 158 and 159 corresponding to the respective five picture elements of the picture element numbers 56 ($d(i-2)$), 57 ($d(i-1)$), i, 59 ($d(i+1)$) and 60 ($d(i+2)$) centered on i are substituted, that is, $$S(i) = |\{199+195-[159+159]\}| = 77$$

Figure 5:
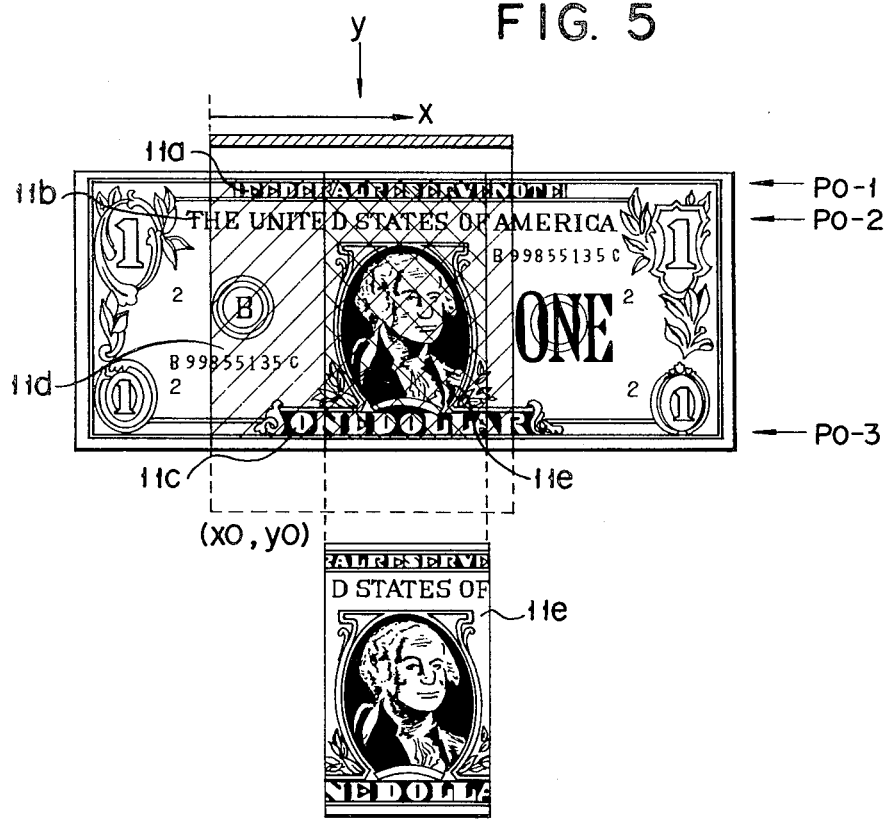
FIG. 5 is a view showing a data detection area of a bank note.

Briefly, the numerical values 119, 115, 160, 158 and 159 are multiplied by respective factors 1, 1, 0, $-1$ and $-1$, and the products are added together to obtain $S(i)$. In this way, $S(i)$ is obtained every time $D(i)$ is shifted through one stage. The signal $S(i)$ is compared in the comparator 23 with a first standard data, for instance of a value 50. If $S(i) \geq 50$, the comparator 23 provides output of "1", and this signal "1" is provided from the AND gate 25 in response to a timing pulse $T_4$. This output of the AND gate 25, i.e., a signal $C(i)$, is supplied to the counter 26. The counter 26 is cleared for every scanning cycle period in response to the timing pulse signal $T_6$ to count, for instance, "1"s in the signal $C(i)$. When the "1"s in one scanning period are counted by the counter 26, the count G is compared in the comparator 27 with a second standard data of the second standard data circuit 28. If $G \geq$ the second standard data, a character row detection signal $P_0$ is provided through the AND gate 29 in response to a timing pulse $T_5$. The second standard data is so set that the detection signals $P_{0-1}$, $P_{0-2}$ and $P_{0-3}$ are produced in correspondence with respective character rows 11a, 11b and 11c shown in FIG. 5. The detection signal $P_{0-1}$ which is provided first, is identified as the first character row 11a, i.e., the edge of the printed section of the bill 11, and necessary information (representing brightness, color hut, etc.) is obtained from the information corresponding to the data detection area 11d extending in the direction of arrow Y from the character row 11a as the leading edge of the area.

Figure 6:
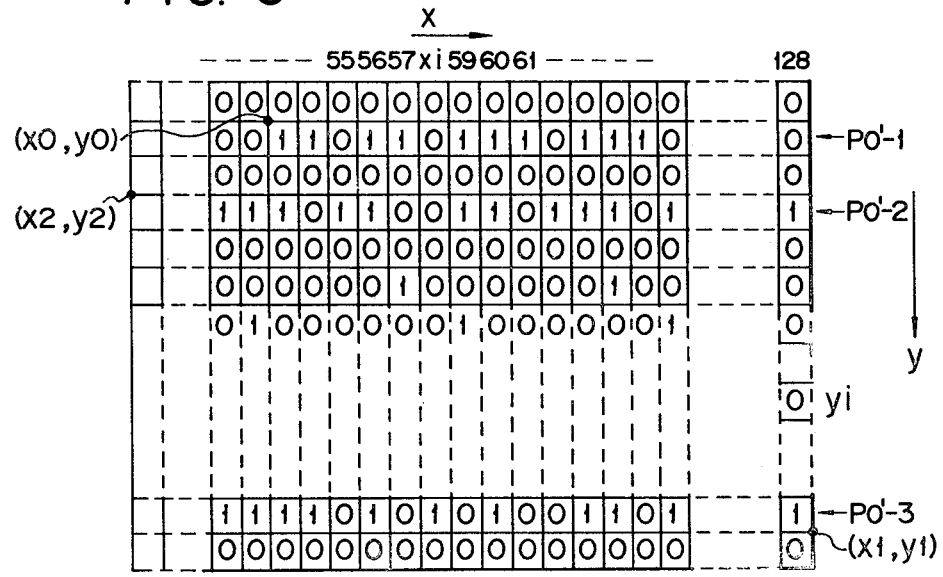
FIG. 6 is a view showing data of bank note stored in a memory.

In this embodiment, a character row detection signal is provided when the line sensor 14 completes one scanning, and the character rows in the Y direction is detected on real time. Alternatively, the signal $C(i)$ provides through the AND gate 25 may be supplied to and stored in the position memory 30 as shown by a broken line, for obtaining the character row detection signal $P_0$ from the data stored in the position memory 30. In this case, the position calculation circuit 31 calculates the necessary starting point $(x_0, y_0)$ of the data detection area 11e from the data stored in the position memory 30. In the stored data shown in FIG. 6, the start point of the area 11e is shown as $x_0, y_0$, and the end point is shown as $(x_1, Y_1)$ in the detection signal $P_{0-3}$. The data detection start point is shown by $(x_2, y_2)$, and the data detection are corresponding to the detection signal $P_{0-2}$ is determined from this point.

While in the above embodiment the signal $S(i)$ for the picture element of the picture element number i is calculated by the five stage-shift register 18 and calculator 22 so that the signal $S(i)$ will not be affected by wrinkles or cal contamination of the currency note, the number of tages of the shift register 18 may be increased or reduced depending upon the state of the currency note. Also, in case if there is no need of considering the effects of wrinkles or local contaminations of the currency note, the shift register and calculator may be replaced with an analog differentiating circuit (i.e., CR differentiating circuit) for differentiating an analog scanning signal. In this case, an analog comparator is used as the comparator 23.

Figure 7:
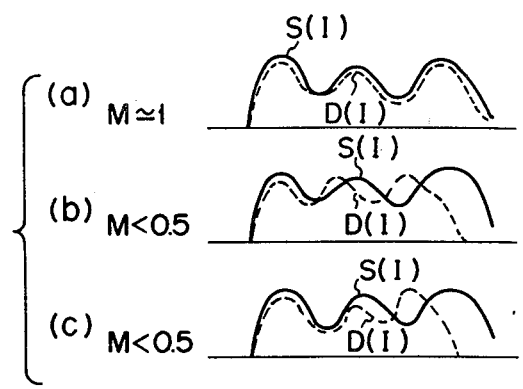
FIG. 7 is a view showing the similarity of detected waveform to standard waveform.

Namely, signals D(i) obtained in the X direction scan are accumulated and varied in each scan; i.e., when the signals D(i) are detected as Y-direction variation $$\left(D(I) = \sum_{i=1}^{128} D(i)\right),$$

the detected waveform D(I) and reference waveform S(I) become as is shown by a to c in FIG. 7. In (a), the detected pattern D(I) and standard pattern S(I) are shown to be ideally similar, that is, the similarity between them is M≃1. In (b), the detected pattern D(I) shown in deviation in phase from the standard pattern S(I) due to a shrinkage of the currency note examined. In this case, the similarity is M<0.5. The currency note in this case is rejected. In (c), the detected pattern D(I) is deviated particularly outstandingly for the second half from the standard pattern S(I) due to a crease formed in the currency note at the center thereof by the folding thereof. In this case, the similarity is M<0.5, and the currency note is rejected. When an enlarged, shrunk or creased currency note is checked, it is difficult to effect identification by only comparing the detection waveform D(I) and the reference waveform S(I). Such currency notes having shrinkage, wrinkles or creases, however, may be verified by determining the similarity at a plurality of points as in the following embodiment.

Figure 8:
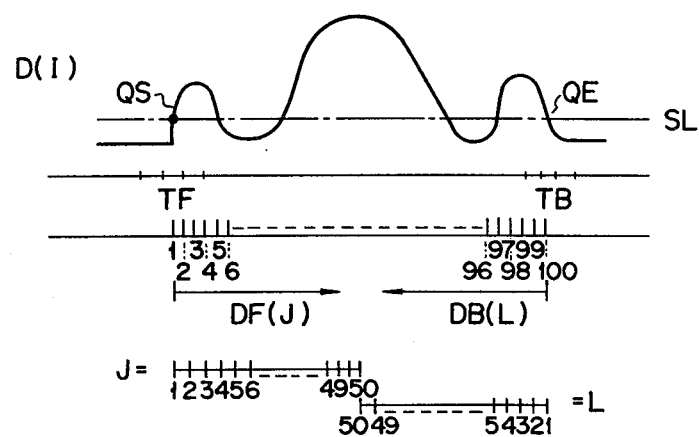
FIG. 8 is a waveform chart showing a sum signal.

As shown in FIG. 8, a detected pattern D(I) is sampled at, for instance, 100 points inclusive of the start and end points $Q_S$ and $Q_E$. The data for 50 sampling points from the start point $Q_S$ of the detected pattern D(I) [I=1 to 100] is labeled DF(I) [(I=1 to 50], and the data for 50 sampling points from the end point $Q_E$ is labeled DB(I) [I=51 to 100]. For the standard pattern, the data for 50 sampling points from the start point are preset as DSB(I) [I=51 to 100], and the data for 50 sampling points from the end point are preset as BS(L) [L=1 to 50]. The first similarity $M_F$ with the start point $Q_S$ as the first point is obtained as $$M_B = \frac{\sum_{I=1}^{50} DB(I) \cdot DSB(I)}{\sqrt{\sum_{I=51}^{100} DB(I)} \cdot \sqrt{\sum_{I=51}^{100} DSB(I)}} \quad (3)$$

$$M_F = \frac{\sum_{I=1}^{50} DF(I) \cdot DSF(I)}{\sqrt{\sum_{I=1}^{50} \{DF(I)\}^2} \cdot \sqrt{\sum_{I=1}^{50} \{DSF(I)\}^2}} \quad (2)$$

While various combinations of the above two similarities are conceivable, in this embodiment the average value of both the similarities $M_F$ and $M_B$, i.e., the average similarity $M = (M_F + M_B)/2$, is obtained, and the identification of currency notes is made according to this average similarity M. Where a plurality of different kinds of currency notes are dealt with for identification, the average similarity M is obtained for each of a plurality of standard waveform data for the respective different standard currency notes, and the standard waveform data for which the similarity M is maximum is detected to identify the kind of the currency note examined. In the illustrate embodiment, five similarity degrees $M_1$, $M_2$, $M_3$, $M_4$ and $M_5$ are obtained with respect to respective different bills, namely one dollar, five dollar, ten dollar, fifty dollar and one hundred dollar bills, and the maximum similarity is detected from among these similarities $M_1$ to $M_5$ to identify the currency note as that of the corresponding kind. In the above-mentioned embodiment, sampling is effected with the detection waveform divided into 100 points as measured from the leading edge $Q_S$ to the trailing edge $Q_E$ thereof, thereby obtaining data on the 50 sample points from the leading edge $Q_S$ and data on the 50 sample points from the trailing edge $Q_E$. However, it is also possible to obtain data on the 50 sample points from the leading edge and data on the 50 sample points from the trailing edge with the detection waveform divided into 120 points as measured from the leading edge $Q_S$ to the trailing edge $Q_E$.

In the formula for determining the degree of similarity, the term is set as DB(I) (I=51 to 100). This value is for when there is no enlargement or shrinkage of the note. When there is enlargement or shrinkage, I=100, and the trailing edge of the note is not detected, and when I=100±α, the trailing edge is detected. In this case, the detected scanning number 100±α is taken as the reference and the data from this reference in the reverse direction to 50 sample points, or 51±α, is used.

Figure 9:
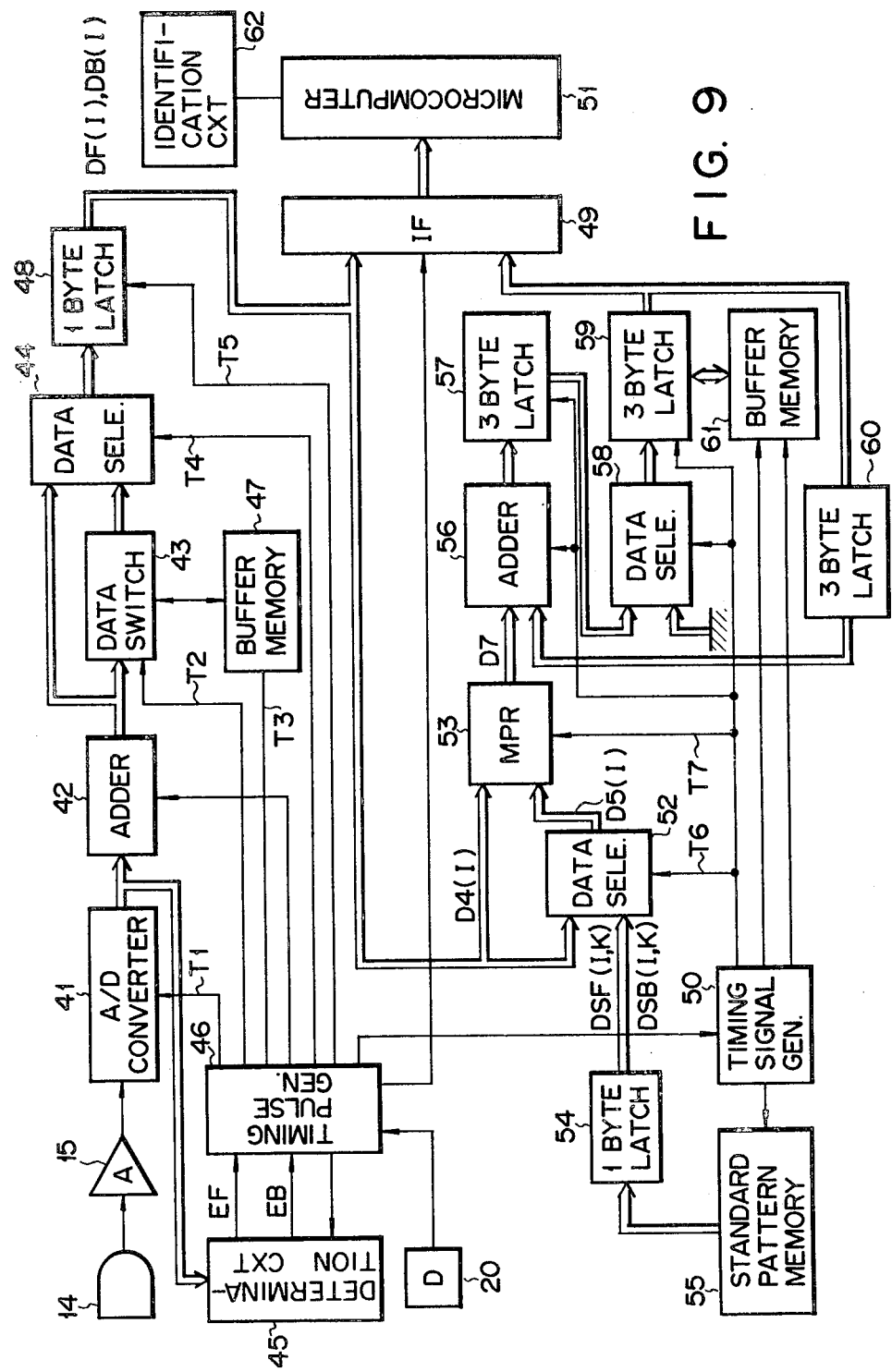
FIG. 9 is a block circuit diagram showing a different embodiment of the currency note identification system.

FIG. 9 shows a block circuit diagram of the currency note identification system using the average similarity mentioned above. In this circuit, the output end of the CCD line sensor 14, which has 128 picture elements, is connected through the amplifier 15 to the input end of an 8-bit A/D converter 41, which has its output end connected to the input end of an adder 42 and a signal detection area determination circuit 45. The output end of the adder 42 is connected through a data switch 43 to the input end of a data selector 44 and is also directly connected to the input end of the data selector 44. The signal detector area determination circuit 45 has output ends connected to trigger input ends of a timing pulse generator 46, which has output ends respectively connected to the control input ends of the A/D converter 41, the data switch 43, a buffer memory 47, the adder 42, a one-byte latch circuit 48, an interface circuit 49 and a second timing pulse generator 50. The buffer memory 47 is connected to the data switch 43, and the output end of the data selector 44 is connected to the input end of the one-byte latch circuit 48. The output end of the latch circuit 48 is connected through the interface circuit 49 to the input end of a microcomputer 51, and is also connected to one of input ends of the data selector 52 and also to one of input ends of a multiplier 53. A standard pattern memory 55 has its output end connected through a one-byte latch circuit 54 to another input end of the data selector 52, and the output end thereof is connected to another input end of the multipler 53. The output end of the multiplier 53 is connected to one of input end of an adder 56, which has its output end connected through a three-byte latch circuit 57 to one of input ends of a data selector 58. The other input end of the data selector 58 is grounded and the output end thereof is connected through a three-byte latch circuit 59 to another input end of the interface circuit 49 and also connected to the input end of a three-byte latch circuit 60. The output end of the three-byte latch circuit 60 is connected to the other input end of the adder 56. A buffer memory 61 is connected to a one-byte latch circuit 59. The second timing pulse generator 50 supplies timing pulses $T_1$ to $T_5$ respectively to the standard pattern memory 55, data selector 52, multiplier 53, adder 56, three-byte latch circuit 57, three-byte latch circuit 59 and buffer memory 61 in response to an output pulse $T_0$ of the photo switch 20. The output end of the microcomputer 51 is connected to the input end of a final identification circuit 62.

In this embodiment, the line sensor 14 provides a scanning signal V(i) [i=1 to 128] including 128 picture element signals corresponding to respective picture elements for every scanning. The scanning signal V(i) is coupled through the amplifier 15 to the A/D converter 41, which converts the individual picture element signals at levels corresponding to the intensity of light incident on the picture elements of the line sensor into corresponding 8-bit digital picture element signals. These 128 digital picture element signals are inputted to the adder 42 and the signal detection area determination circuit 45. The average value of these picture element signals is calculated by the adder 42. The digital signal D(I) presenting the average value, obtained from the adder 42, is supplied to data switch 43 and data selector 44. The data switch 43 is switched in response to the timing pulse $T_2$ to transfer the output signal D(I) of the adder 42 to the buffer memory 47 or transfer the data D(I) stored in the buffer memory 47 to the data selector 44. Namely, data swtich 43 is provided to transfer the output signal D(I) of adder 42 to buffer memory 47 by the PO signal from the leading/trailing edge detection circuit shown in FIG. 2 from the time the leading edge is detected until the trailing edge is detected. After the trailing edge has been detected, data switch 43 transfers data DB(I) (I=71±α to 120±α), from the trailing edge up to 50 sample points, to data selector 44. The data selector 44 selects the signal DF(i) and supplied it to the latch circuit 48 for a first period $T_F$ and selects the signal DB(I) read out from the buffer memory 47 and supplies to the latch circuit 48 for a second period $T_B$ in response to the timing pulse $T_4$. The latch circuit 48 provides N/2 samples data DF(I) for the 50 points from the start point $Q_S$ for the first period $T_F$ and N/2 sampled data DB(I) (I=51±α to 100±α) for the 50 points from the end point $Q_E$ in response to the timing pulse $T_5$. The first period $T_F$, the data DF(I) are supplied to the data selector 52 and multiplier 53. A signal DSF(I, K) which represents a standard pattern each kind of currency note for the first period $T_F$, is supplied from the standard pattern memory 55 through the latch circuit 54 to the data selector 52. The data selector 52 selects the signal DF(I) or DSF(I, K) and supplies it as a signal $D_5(I)$ to the multiplier 53 in response to the timing signal $T_6$. The multiplier 53 first calculates the product of DF(I) and DF(I), i.e., $DF(I)^2$, and then calculates the product of DF(I) and DSF(I, K), i.e., DF(I)·DSF(I, K), and it supplied the result as a signal D7 to the adder 56. On the signal D7, calculations according to equations $$QF = \sum_{I=1}^{50} (DF(I))^2, \quad (4)$$

$$RF(K) = \sum_{I=1}^{50} DF(I) \cdot DSF(I, K) \quad (5)$$

are made through the adder 56, three-byte latch circuit 57, data selector 58, three-byte latch circuit 59, buffer memory 61 and three-byte latch circuit 60. K shows the types of notes from 1 to 5. First, buffer memory 61 is cleared when the input from data selector 58 is switched to ground polarity. Multiplier 53 calculates $(DF(1))^2$ by the signal DF(1) of the first scanning from latch circuit 48 being supplied to the input of multiplier 53 together with this signal DF(1) being supplied via data selector 52. The $(DF(I))^2$ signal is supplied to one input of adder 56 but the $\Sigma(DF(I))^2$ area of buffer memory 61 is cleared so the 0 signal is maintained. Because the 0 signal is supplied to the other input of adder 56 via 3-byte latch circuit 59, the output of adder 56 becomes $(DF(1)L^2+0=(DF(1))^2$. The output of adder 56 is stored in the $\Sigma(DF(I))^2$ area of buffer memory 61 via 3-byte latch circuit 57, data selector 58 and 3-byte latch circuit 59.

When data selector 52 is switched to the input connected to reference pattern memory 55 via 1-byte latch circuit 54, multiplier 53 calculates [DF(1)·DSF(1.1)]. DSF(1.1) shows reference data corresponding to the first scannning signal of a one-dollar bill. The output of multiplier 53 is supplied to one input of adder 56. Because the other input is 0, the output [DF(1)·DSF(1.1)] of adder 56 is transferred to the $\Sigma(DF(I)·DSF(1.1)$ area of buffer memory 61 via latch circuit 57, data selector 58 and latch circuit 59. DSF(1,1) is outputted from reference pattern memory 55 so multiplier 53 calculates [DF(1)·DSF(1,2)]. DSF(1,2) shows the reference data corresponding to the first scanning signal of a 5-dollar bill. The output of multiplier 53 is stored in the $\Sigma DF(I)·DSF(I,2)$ area of buffer memory 61 via latch circuit 57, data selector 58 and latch circuit 59.

The multiplication result of reference data DSF(1,3), DSF(1,4) and DSF(1,5) is stored in the corresponding area of the buffer memory.

The second scanning line data DF(2) from latch circuit 48 is output and supplied to one input of multiplier 53, and supplied to the other input via data selector 52. Accordingly, the output of multiplier 53 becomes $(DF(2))^2$ and this data is supplied to one input of adder 56. As the $(DF(1))^2$ data is already stored in the $\Sigma(DF(I))^2$ area of buffer memory 61 this data is supplied to the other input of adder 56 via latch circuits 59, 60. Accordingly, the sum becomes $(DF(1))^2+(DF(2))^2$ and this result is stored in the $\Sigma(DF(I))^2$ area of buffer memory 61 via latch circuit 57, data selector 58 and latch circuit 59.

When data selector 52 is switched to the input which is connected to reference patternmemory 55, the second scanning data DSF(2,1) from reference pattern memory 55, corresponding to a 1-dollar note, is transferred to multiplier 53. Multiplier 53 then calculates DF(2)·DSF(2,1). Accordingly, adder 56 calculates DF(1.)·DSF(1.1)+DF(2)·DSF(2,1). The addition result is stored in the $\Sigma DF(I)·DSF(I.1)$ area of buffer 61. When the calculation for the 1-dollar data is completed, the second scanning data DSF(2,2) for a 5-dollar bill is output from reference pattern memory 55 so multiplier 53 calculates DF(2)·DSF(2,2). Adder 56 calculates DF(1)·DSF(1,2)+DF(2)·DSF(2,2). The addition result is stored in the corresponding ΣDF(I)·DSF(I.2) area of buffer memory 61.

The equations (4) and (5) are calculated by the above operations being effected for each type of note (K=1 to 5) and each scan (I=1 to 50).

The signals QF and RF(K) are supplied to the interface circuit 49. The interface circuit 49 supplied to the signals DF(I), QF and RF(K) to the micrcocomputer 51. The microcomputer 51 calculates the similarity M(K) according to a predetermined program. The similarity MF(K) is calculated accordng to an equation $$MF(K) = RF(K)/\sqrt{QF} \cdot \sqrt{ZF(K)} \quad (6)$$

where ZF(K) is the summation of the squares of the individual standard waveform data DSF(I, K) which is stored in a memory of the microcomputer 51. The similarity MB(K) with respect to the data DF(I) for the first period $T_F$ is obtained in the above way. When the printed edge of the currency note, thereafter, is detected, the similarity MB(K) with respect to the data DF(I) for the second period $T_B$ is then obtained in the manner as described. In this case, the standard waveform data DSB(I, K) and detected data DB(I) are supplied to the data selector 52. Thus, calculation is performed from I=100 toward I=50.

In the microcomputer 51, the determination of the kind of the currency note examined, i.e., the determination as to if the currency note is a genuine one dollar bill, ten dollar bill, one hundred dollar bill, etc., is effected with respect to the individual data DF and DB. The final identification circuit 62 makes the final identification on the basis of the result of determination.

The final identification circuit 62 will now be described in detail with reference to FIG. 10. The interface circuit 49 has output ends connected to registers 66 and 67, which are included in the microcomputer 51 and serve to determine the currency note kind with respect to respective first and second areas. The registers 66 and 67 have their output ends connected to input ends of a summing register 68, which has its output end connectedto the input end of the final identification circuit 62.

In the determination with respect to the first area, if the five-dollar bill, for instance, is detected as one with respect to which the similarity MF(K) calculated from the data DF(I) is above a predetermined reference value (which is 0.6 in this embodiment), a five-dollar bill flag in the first area determination register 66 is set to "1" while the other flags, namely one-dollar, ten-dollar and one hundred-dollar bill flags, all set to "0". Like wise, if in the determination with respect to the second area the five-dollar bill is detected as one with respect to which the similarity MB(K) K=1 to 5) calculated from the data DB(I) for this area is above a reference value of 0.6, a five-dollar bill flag in the second area determination register 67 is set to "1" while the other flags are all set to "0". The summing register 68 adds the contents of the first and second area determination registers 66 and 67, and the final identification circuit 62 detects the flag, for which the sum is maximum, from the content of the summing register 68 and identifies the examined bill as the corresponding bill, namely the five-dollar bill.

The above method of identification will be described in more detail with reference to FIG. 11. In an example (a) in FIG. 11, the five-dollar bill is detected with respect to both the first and second areas as shown at $D_1$ and $D_2$, and "2" is obtained as the sum $D_S$ of the five-dollar bill flag value. Thus, the result X of the final identification is "1" for the five-dollar bill, and the bill examined is identified as the five-dollar bill. In an example (b) in FIG. 11, the five-dollar bill is detected with respect to the first area, while the ten-dollar bill is detected with respect to the second area, and the sum $D_S$ of the flag values is "1" for both five-dollar and then-dollar bills. In this case, no bill is detected as the result X of final identification, and the bill not examined is thus rejected. In an example (c) in FIG. 11, the five-dollar or ten-dollar bill is detected with respect to the first area, and the one-dollar or five-dollar bill is determined with respect to the second area, and the sum $D_S$ of the flag values is "1" for the one-dollar and ten-dollar bills and "2" only for the five-dollar bill. From these sum data $D_S$, the examined currency note i.e. bill is identified as the five-dollar bill for which the flag value sum is maximum. In an example (d) in FIG. 11, no bill is detected with respect to the first area, and the five dollar bill is detected with respect to the second area, and the bill examined is identified as the five-dollar bill as the result of the final identification.

As has been shown, in the second embodiment described above the final identification is made on the basis of the determination results with respect to at least two determination areas, so that it is possible to obtain high performance identifying function less prone to midjudgement.

In the preceding first and second embodiments, the identification of the examined currency note made on the basis of the similarity of the direct current component of the detected data of the currency note, and this method of identification has the following effects.

(1) Since the sum of signals for small picture elements in a sufficiently wide area in the main scanning direction (X direction) is taken, the identification is less subject to the influence of local noises such as those due to creases or wrinkles, and it is possible to identify currency notes with less misjudgement or rejection. Also, since the identification is not based upon any "1" or "0" at an infinitesimal point but upon multi-value information, the allowable positional deviation or skew of the currency note can be increased.

(2) Since the sums of density values in the main scanning direction are detected as successive multi-value patterns and their similarity with respect to a standard multi-value pattern, high performance identification free from the influence of the overall contamination of the currency note is possible.

(3) Since the density value sum is obtained for every scanning cycle and the similarity is calculated for the successive cycles, real-time processing is possible, and thus an automatic currency note sorting apparatus which is capable of high speed identification and has a high unit-time processing capacity, can be obtained.

(4) Since the density value sum is obtained for every scanning cycle for calculating the similarity for successive cycles, no buffer memory having a high capacity is required. In addition, the standard waveform signal memory may be a far small capacity memory compared to the case of storing two-dimensional image data.

While in the preceding embodiments a digital adder has been used as means for obtaining the sum, the same effects of the invention will also be obtained by using an integrating circuit for obtaining the sum analog-wise. Further, while in the preceding embodiments the detection area in the X-axis direction has been determined on the basis of a portion of the scanning signal corresponding to the borderline between the margin and printed section of the currency note, it is also possible to determine the detection area on the basis of any pont so long as the point can be cleraly detected from the scanning signal. Further, a fixed detection area in the X-axis direction may be preset in case if the positional deviation of the currency note scanned is within a permissible range. Further, while in the preceding embodiments in the Y-axis direction has been determined on the basis of a portion of the sum signal D(I) corresponding to the borderline between the margin and printed section of the currency note, this is by no means limitative, and any characteristic point of a pattern corresponding to a definite portion of the currency note can be detected. Further, it is possible to determine the detection area in the Y-axis direction not from the sum signal D(I) but from the scanning signal V(t) itself, i.e., from a characteristic data contained in the signal V(t).

Now, a further embodiment, in which the similarity is calculated from the alternating current component of the detected data of the currency note, will be described.

The basic concept underlying this embodiment will first discussed with reference to the waveform shown in FIG. 12. Denoting the detected pattern signal by D(I) and the standard pattern signal by S(I), the similarity $M_{AC}$ of the alternating current component is given as $$M_{AC} = \frac{\sum_{I=1}^{N}\left\{\left(D(I) - \frac{\Sigma D(I)}{N}\right) \cdot \left(S(I) - \frac{\Sigma S(I)}{N}\right)\right\}}{\left\{\sum_{I=1}^{N}\left(D(I) - \frac{SD(I)}{N}\right)^2\right\}^{\frac{1}{2}} \cdot \left\{\sum_{I=1}^{N}\left(S(I) - \frac{\Sigma S(I)}{N}\right)^2\right\}^{\frac{1}{2}}} \quad (7)$$

While the alternating current component of the standard pattern signal S(I) can be calculated in advance, the detected pattern signal D(I) cannot be obtained unless the current note is scanned by the line sensor, that is, the alternating current component of the signal D(I) can be obtained only after the end of the scanning. By re-arranging the equation (7), we obtain $$M_{AC} = \frac{\sum_{I=1}^{N}\{D(I) \cdot S'(I)\} - \frac{\Sigma D(I) \cdot \Sigma S'(I)}{N}}{\left(\sum_{I=1}^{N} S'(I)^2\right)^{\frac{1}{2}} \cdot \left(\Sigma(D(I))^2 - \frac{(\Sigma D(I))^2}{N}\right)^{\frac{1}{2}}} \quad (8)$$

where $S(I)' = S(I) - (\rho S(I)/N)$

Since the sum of the alternating current components S'(I) of the signal S(I) is zero, $$M_{AC} = \frac{\sum_{I=1}^{N}\{D(I) \cdot S'(I)\}}{\{\Sigma S'(I)^2\}^{\frac{1}{2}} \cdot \left(\Sigma(D(I))^2 - \frac{(\Sigma D(I))^2}{N}\right)^{\frac{1}{2}}} = \quad (9)$$

$$\frac{\sum_{I=1}^{N}\left(D(I) \cdot \frac{S'(I)}{\{\Sigma S'(I)^2\}^{\frac{1}{2}}}\right)}{\left(\Sigma(D(I))^2 - \frac{(\Sigma D(I))^2}{N}\right)^{\frac{1}{2}}}$$

By using as the standard pattern signal $$S''(I) = \frac{S'(I)}{\{\Sigma S'(I)^2\}^{\frac{1}{2}}} \text{ then,} \quad (10)$$

$$\alpha = \sum_{I=1}^{N} D(I) \cdot S''(I) \quad (11)$$

$$\beta = \sum_{I=1}^{N} D(I) \text{ and} \quad (12)$$

$$\gamma = \sum_{I=1}^{N} (D(I))^2 \quad (13)$$

With these three data, the similarity can be calculated simply and at high speed according to an equation $$M_{AC} = \frac{\alpha}{\{\gamma - (\beta^2/N)\}^{\frac{1}{2}}} \quad (14)$$

In other words, by using the equations (10), (11), (12), (13) and (14), it is possible to obtain real-time processing and realize high speed processing.

Figure 13:
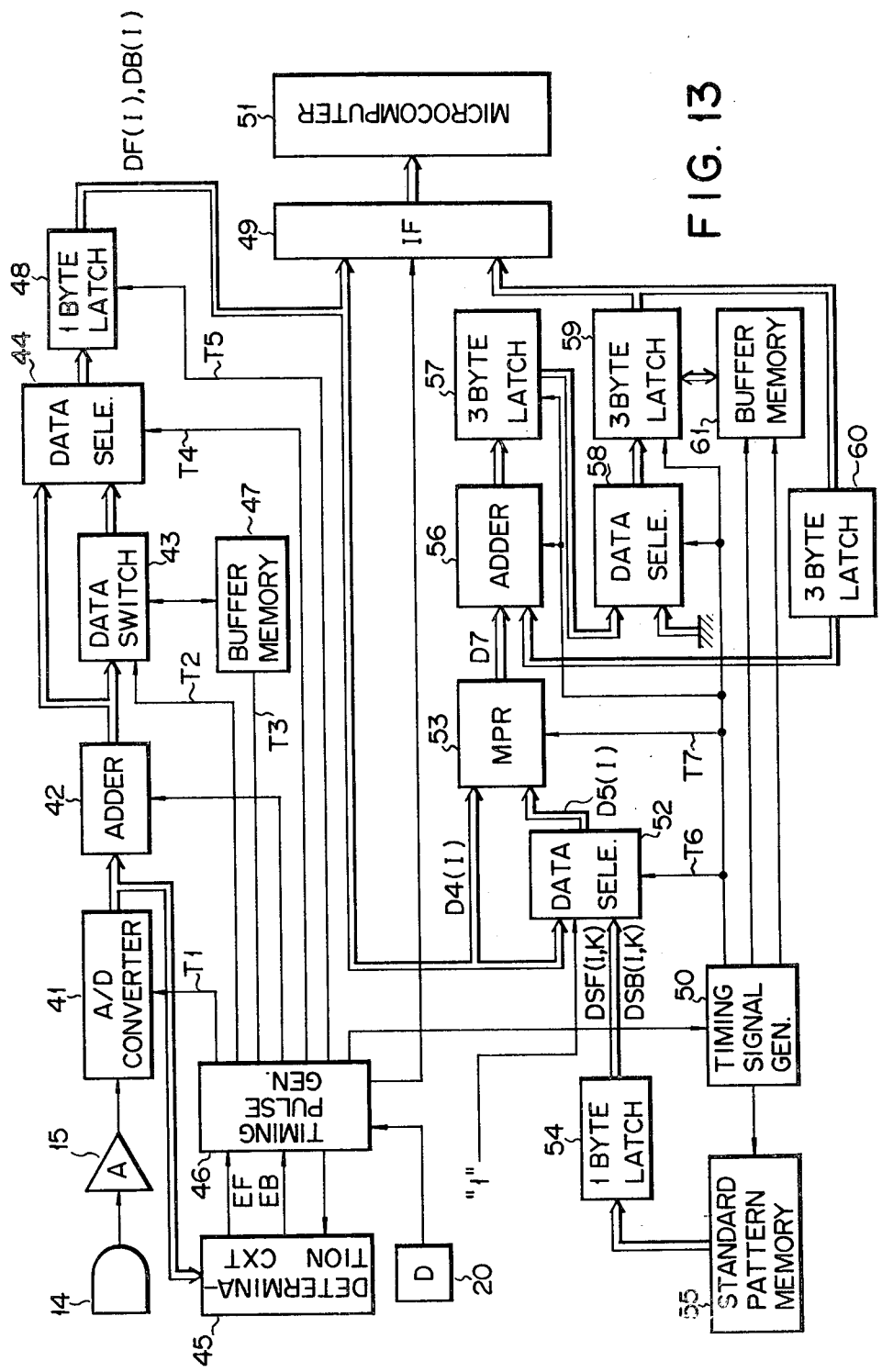
FIG. 13 is a block circuit diagram showing the embodiment of the currency note identification system based upon the principles shown in FIG. 12.

FIG. 13 shows the circuit of a currency not identification system which is based upon the principles discussed above. Basically, the circuit of FIG. 13 is the same as the embodiment of FIG. 9, and like parts are designated by like reference numerals. In this embodiment, the line sensor 14 provides a scanning signal V(i)-[i=1 to 128] including 128 picture element signals corresponding to respective picture elements for every scanning. The scanning signal V(i) is coupled through the amplifier 15 to the A/D converter 41, which converts the individual picture element signals at levels corresponding to the intensity of light incident on the picture elements of the line sensor into corresponding 8-bit digital picture element signals. These 128 digital picture element signals are inputted to the adder 42 and the signal detection area determination circuit 45. The average value of these picture element signals is calculated by the adder 42. The digital signal D(i) representing the average value, obtained from the adder 42, is supplied to data switch 43 and data selector 44. The data switch 43 is switched in response to the timing pulse T₂ to transfer the output signal D(I) of the adder 42 to the buffer memory 47 or transfer the data D(I) stored in the buffer memory 47 to the data selector 44. Namely, data switch 43 is provided to transfer the output signal D(I) of adder 42 to buffer memory 47 by the PO signal from the leading/trailing edge detection circuit shown in FIG. 2 from the time the leading edge is detected until the trailing edge is detected. Ater the trailing edge has been detected, data switch 43 transfers data DB(I) (I=71±α to 120±α), from the trailing edge up to 50 sample points, to data selector 44. The data selector 44 selects the signal D₁(I) and supplies it to the latch circuit 48 for a first period $T_F$ and selects the signal $D_B(I)$ read out from the buffer memory 47 and supplied to the latch circuit 48 for a second period $T_B$ in response to the timing pulse T₄. The latch circuit 48 provides N/2 sampled data DF(I) for the 50 points from the start point $Q_S$ for the first period $T_F$ and N/2 sampled data DB(L) for the 50 points from the end point $Q_3$ in response to the timing pulse $T_5$.

The latch circuit 48 supplies the signals DF(I) and DB(I) in response to the timing pulse $T_5$. The data selector 54 selects signal DF(I), signal DSF (I, K) and decimal signal "1" and supplies a signal D5(I) under the control of the timing pulse T6. As the signal DSF(I, K) are provided K different standard pattern data (calculated according to the equation 10)) stored in the standard pattern memory 55. The multiplier 52 first calculates the product of DF(I) and DF(I), i.e., DF(I)$^2$, then DF(I) and then the product of DF(I) and DSF(I, K), i.e., DF(I)·DSF(I, K). It provides the result as a signal D7, which is processed through the adder 56, latch circuit 57, data selector 58, latch circuits 59 and 60 and buffer memory 61 to obtain the product sum of the signal D7. Then signals QF, DF and RF(K) are calculated according to equations $$QF = \sum_{I=1}^{50} (DF(I))^2 \quad (15)$$

$$DF = \sum_{I=1}^{50} DF(I) \quad (16)$$

and $$RF(K) = \sum_{I=1}^{50} DF(I) \cdot DSF(I, K) \quad (17)$$

The data QF, DF and RF(K) thus obtained are transferred through the interface circuit 40 to the microcomputor 51, which calculates the similarity MF(K) from the afore mentioned signals QF, DF and RF(K) according to an equation (18)

$$MF(K) = RF(K)/(QF - |(DF)^2/N|)^{\frac{1}{2}} \quad (18)$$

The sampled data DF(I) is used when producing the standard pattern data DSF(I, K) and DSB(I, K).

The similarity MF(K) obtained in the above way is that with respect to a predetermined area from the leading edge of the printed section of the currency note, and the similarity with respect to a predetermined area from the trailing edge is obtained similar to MF(K). In this case, the scanning signal from line sensor 14 is added by adder 42 and stored in buffer memory 47. Also, the data DF(I)(I=1 to 50) corresponding to the first area is processed in real time by way of data selector 44 and 1-byte latch circuit 48. However, data DB(I)-(I=51 to 100) corresponding to the second area is stored in the first buffer memory 47, and then, after the trailing edge section has been detected, the same calculation as for the first area is performed for the 50the data from the trailing edge section, for example, when the 98the line is the trailing edge, DB(I)(I=49 to 98). At this time the data from reference pattern memory 55 is also used for calculation of data DSB(I,K) which corresponds to the second area.

From MF(K) and MB(K) calculated in the above way, the overall similarity M(K) is calculated from the ((MF(K)+MS(K))/2 to detect the standard pattern data for which M(K) is maximum, and the kind of the currency note examined is determined from this standard pattern data. If M(K) is less than a limit value, for instance 0.6, the examined currency note is rejected as it corresponds to one of the currency notes represented by the standard pattern data.

As has been described in the foregoing, with the currency note identification system according to the invention, the characteristic of a portion of a scanning signal obtained by scanning a printed matter, particularly a currency note, being examined is detected, the characteristic of a predetermined portion of the scanning signal of the currency note from the point corresponding to the afore mentioned detected portion of the scanning signal is detected, the similarity of the characteristic of the detected scanning signal is compared to that of a standard scanning signal, and the kind and/or genuineness of the examined currency note is determined from the calculated similarity, so that it is possible to obtain high performance identification as to the kind and/or genuineness of the currency note without substantially being affected by contaminations, shrinkage, wrinkles creases, etc.

While in the above embodiments the identification information is detected from the leading or trailing edge of the printed section of the currency note as the start point, it is also possible to detect the identification information from a particular point within the printed section as the start point. Further, according to the invention it is possible to identify not only currency notes but also other printed matter requiring identification such as securities. Further, while a line sensor has been used as means for providing the scanning signal, it is also possible to use a two-dimensional scanning device such as a video camera as well.

What we claim is:
1. A printed matter identification system comprising:
means for scanning a printed pattern of said printed matter and generating a plurality of scanning signals indicative thereof;
means, coupled to said scanning and generating means, for detecting a particular one of said scanning signals having a predetermined characteristic from among said plurality of scanning signals;
means, coupled to said detecting means for determining a fixed portion of said printed pattern corresponding to said detected scanning signal; means, coupled to said determining means, for generating characteristic data corresponding to said fixed portion of said printed pattern and defining it as a start point;
standard reference data generating means for generating reference data representing a characteristic of a scanning signal that would result from scanning a standard printed pattern;
means for calculating a degree of similarity between the data generated by said characteristic data generating means and said reference data; and
means, coupled to said calculating means, for determining the kind and/or genuineness of said examined printed matter from said degree of similarity calculated by said similarity calculating means.

2. A printed matter identification system according to claim 1, wherein said printed matter has a leading edge and a trailing edge of a printed section thereof, and also wherein said fixed portion detecting means includes means for detecting the positions of said leading and trailing edges of said printed matter by detecting the characteristics of scanning signals corresponding to said respective leading and trailing edges.

3. A printed matter identification system according to claim 2, wherein said characteristic data generating means detects scanning signals corresponding to predetermined areas set from said leading and trailing edges, respectively, to generate the characteristic data.

4. A printed matter identification system according to any one of claims 1 to 3 wherein said scanning siganls include a direct current (dc) component and said similarity calculating means calculates a similarity between said direct current component and said reference data.

5. A printed matter identification system according to any one of claims 1 to 3, wherein said scanning signals include an alternating current (ac) component and said similarity calculating means calculates a similarity between said ac component and said reference data.

6. A printed matter identification system according to claim 2 or 3, wherein the chracteristic of said scanning signal is constituted by a plurality of changes corresponding to the density changes of the printed pattern at said leading and trailing edges.

7. A printed matter identification system comprising:
means for scanning a printed pattern of said printed matter and generating a plurality of scanning signals indicative thereof, each scanning signal including a number of picture element signals;
summing means for summing the picture element signals of each of the scanning signals and generating successive sum signals as examined multi-value data for each of said scanning signals;
means for generating reference multi-value data corresponding to a reference printed pattern; and
means for calculating a degree of similarity between said examined multi-value data and said reference multi-value data;
means for determining the kind and/or genuineness of said examined printed matter from the similarity calculated by said similarity calculating means.

8. A printed matter identification system according to claim 7 which further comprises means for detecting at least one scanning signal having a predetermined characteristic from among the plurality of scanning signals and detecting at least one fixed portion of said printed pattern by means of the detected scanning signal, and means for detecting at least one portion of the examined multi-value data corresponding to at least one predetermined area of said printed pattern from said fixed portion detected by said means for detecting at least one fixed portion detecting means and defining it as a start point.

9. A printed matter identification system according to claim 8, wherein said means for detecting at least one fixed portion detects a plurality of fixed portions of said examined printed matter, and also wherein said means for detecting at least one portion of the examined multi-value data detects multi-value data for a plurality of predetermined areas and supplied the multi-value data to said similarity calculating means.

10. A printed matter identification system according to claim 9, wherein said degree of similarity calculating means calculates a plurality of degrees of similarity of detected multi-value data with respect to said respective predetermined areas, and means for combining said plurality of degrees of similarity and detecting a similarity for which a maximum value is obtained.

11. A printed meatter identification system according to claim 9, wherein said examined printed matter has a leading and a trailing edge of a printed section, and also wherein said means for detecting at least one fixed portion determines the positions of said leading and trailing edges of said printed matter by detecting the portions of the detected multi-value data corresponding to said leading and trailing edges.

12. A printed matter identification system according to any one of claims 7 to 11, wherein said similarity calculating means calculates a similarity of a direct current component of the examined multi-value data.

13. A printed matter identification system according to any one of claims 7 to 11, wherein said similarity calculating means calculates a similarity of an alternating current component of the examined multi-value data.

14. A printed matter identifying system according to claim 7, wherein said scanning signal generating means includes means for transferring said examined printed matter in a first direction and one-dimensional scanning means for generating scanning signals for scanning lines extending in a second direction perpendicular to said first direction.

15. A printed matter identification system according to any one of claims 7 to 11, wherein said scanning signal generating means is constituted by two-dimensional scanning means.

16. A printed matter identification system according to claim 14, wherein said similarity degree calculating means performs a calculation of the similarity of a leading area detected from the leading edge immediately after detection of the leading area, while performs a calculation of the similarity of a trailing area detected from the trailing edge by means of a trailing area data read out from a memory.

17. A printed matter identification system according to claim 8, 9 or 11 wherein said means for detecting at least one fixed portion detecting means comprises means for detecting and counting those of the picture element signals of one of the scanning signals which have a level over a predetermined signal level.

* * * * *